Patented May 18, 1948

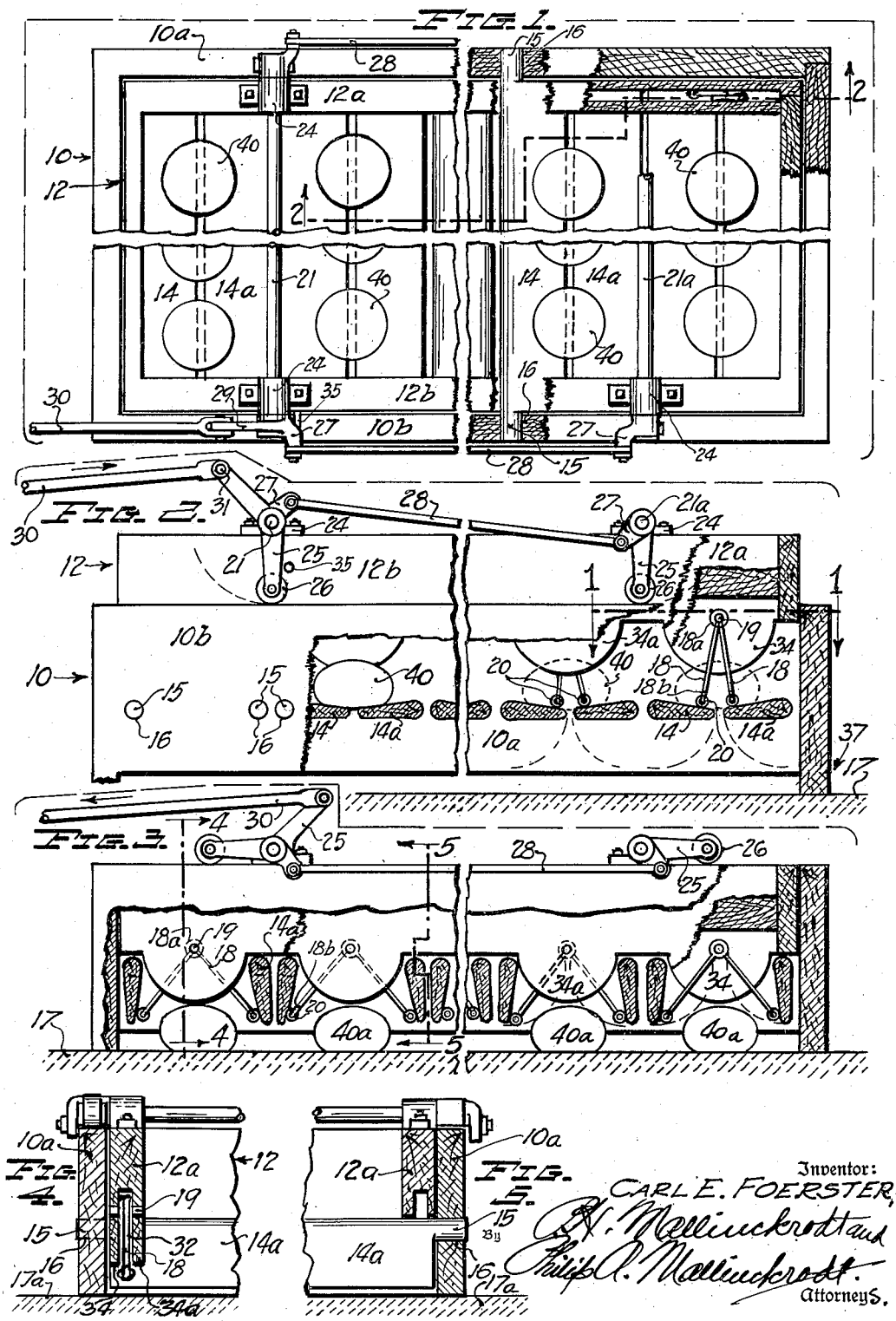

2,441,806

UNITED STATES PATENT OFFICE 2,441,806

MECHANICAL PEEL

Carl E. Foerster, Salt Lake City, Utah

Application July 11, 1944, Serial No. 544,437

7 Claims. (Cl. 107—56)

This invention, in a somewhat restricted sense, relates to a mechanical peel for placing a plurality of bakery items simultaneously on a baking hearth. In a broader sense it relates to a device for simultaneously placing a plurality of articles on a surface.

Ordinarily in placing items such as rolls or loaves of bread on a hearth one by one, or in groups of only a few items, the time of baking varies considerably between the placing of the first item to the placing of the last item, so that strict uniformity of baking throughout the entire product cannot be attained.

By means of the present invention, an entire baking hearth can be filled at once, that is to say, the items to be baked are deposited simultaneously over the entire area of the hearth. According to the invention, the mechanical peel comprises a series of depressible or retractive blades, advantageously arranged in pairs, which extend clear across one dimension of the peel. The mechanical peel is suitably supported so that it can be pushed bodily into the oven and all the blades be simultaneously depressed, whereupon each pair of blades discharges its load upon the hearth.

The principal objects of the invention are:

To reduce to a minimum the time and labor required to charge a baking hearth.

To make unnecessary the exposure of a baker to the intense heat of a hearth for any considerable period of time, thus relieving him of the hard and health-impairing work of charging the hearth.

To place a large number of individual items simultaneously in certain desired positions in one operation.

To be simple and effective in use.

To be relatively inexpensive to construct.

One embodiment of the invention is illustrated in the accompanying drawing in which, Fig. 1 represents a plan, partly in section on the line 1—1 in Fig. 2; portions being broken away for convenience;

Fig. 2, a side elevation, partly in section, taken on the line 2—2 in Fig. 1, portions being broken away for convenience;

Fig. 3, a view similar to that of Fig. 2, but showing certain parts in alternate positions; and, Figs. 4 and 5, fragmentary sections taken respectively on the lines 4—4 and 5—5 in Fig. 3, the sections being taken through the far side walls of the device.

Referring to the drawing, the numerals 10 and 12 denote two frames, both open at the top and bottom, the frame 12 being loosely disposed within frame 10 so that it may be moved freely and guided up and down therein. The frame 12 has an upper position as shown in Fig. 2, and a lower position as shown in Fig. 3.

Extending from side to side of the frame 12 are a series of article-supporting elements in the form of blades preferably arranged in pairs, each pair comprising individual blades 14 and 14a. Each blade is supported or hinged in the frame 10, for example by means of two journal extensions 15 arranged to swing in corresponding bearings 16, the latter being formed in the respective sides 10a and 10b of the frame 10. The bearings of each pair of blades are spaced apart a distance sufficient to allow items such as rolls or loaves, to pass between them when such items are to be discharged and deposited, for example, on a baking hearth 17. It is desirable that the adjacent blades of any two pairs have their axes substantially parallel to each other and be placed quite closely together so as to economize the space in a direction transverse of the blades. This is clearly illustrated in Figs. 1, 2 and 3. In Fig. 2 the blades are shown in a position adapted to receive and hold their load, while in Fig. 3, the position of the blades is shown depressed or retracted, the load in the meantime having been discharged.

In order to move the blades from one position to the other, or vice versa, a series of links 18 is provided, which may extend from various points such as 19, along the sides 12a and 12b of the frame 12, to points in proximity to the freely swinging or rocking edges of the blades. The links 18 have eyelets 18a by means of which they hang pivotally from the pins 19. Other eyelets 18b engage cooperating eyelets 20 secured in the blades.

When the frame 12 is lifted relative to the frame 10, for example from the position shown in Fig. 3 to the position shown in Fig. 2, all the blades will be simultaneously pulled up from the position shown in Fig. 3 to the position shown in Fig. 2. When on the contrary, the frame 12 is lowered into the frame 10, the reverse action of the blades takes place, namely, the blades are depressed or retracted from the positions shown in Fig. 2 to the positions shown in Fig. 3. The action of the links 18 in accomplishing this result is clearly shown at the right of Figs. 2 and 3.

The lifting or lowering movements of the frame 12 relatively to the frame 10 may be accomplished by any suitable mechanism, for example, the one illustrated in the present drawing. In this construction, shafts 21 and 21a may be journaled in bearings 24 rigidly mounted on the frame 12, in this instance near the end portions thereof. Rigidly mounted at the extremities of each shaft is an arm 25, which at the free end thereof carries a rotatably disposed wheel or roller 26. Rigidly connected to each arm 25 is another arm 27, the respective arms 27 being pivotally connected to each other by means of a connecting rod 28. Rigidly connected to one of the arms 25, such as the one at the lower left hand corner of Fig. 1, is another arm 29, the latter having an operating rod 30 pivotally connected to it at 31. By moving the rod 30 in the direction of the arrow in Fig. 2, the traction wheels or rollers 26 are moved mutually outward in opposite directions, whereupon the frame 12 is gradually lowered until the position in Fig. 3 is reached. Conversely, when the rod is moved in the direction of the arrow in Fig. 3, the wheels or rollers are moved mutually inward from the position in Fig. 3 to the position in Fig. 2, whereupon the frame 12 is lifted relatively to the frame 10. It is desirable that the rollers 26 on a side move in opposite directions in order to obviate binding stresses between the frames 10 and 12.

The links 18 and 18a and the pins 19 are preferably disposed in both the side rails 12a and 12b, although in some cases satisfactory operation is obtained by placing the links and pins in only one side rail. In order to protect the links 18 and 18a, it is desirable that the lower portions of the side rails be deeply grooved, as clearly indicated at 32 in Fig. 4, thereby providing the depending and shielding lobes 34 and 34a, spaced apart from each other. In each lobe is a bearing for the pivotal pin 19 so that the links hang between the two bearings. This construction has the effect of placing the pin in what is known as "double shear" and results in much smoother operation and greater durability than is the case in constructions where such a pivotal pin is in single shear. This is important since a mechanical peel in an average bakery is generally used hundreds of times a day. Furthermore, in order that the links 18 and 18a shall hang substantially vertical in the respective plane of swinging, the peel blades extend from side rail to side rail of the stationary frame 10 so that the end portions of the finger edges of the peel blades, where the links 18 and 18a are fastened to the respective blades, are located directly underneath the respective side rails of the movable frame 12.

Since wood, as illustrated in the cross-sections of the figures, or some other non-heat absorbing material, provides advantages in the construction and operation of the apparatus of the invention, and since the peel blades are unsupported in the span between the journal bearings 16, the peel blades each have a heavy journal edge for supporting the load, and a light finger edge to facilitate handling the load.

The manner of using the device of the invention will now be described. First, supposing the mechanical peel to be resting in a location apart from the hearth upon which it is used, the blades being in the holding position of Figs. 1 and 2. In the said location, free from the heat of the hearth, the peel is loaded with items such, for example, as rolls 40. Next, the loaded peel is transferred bodily to its unloading position on a hearth, indicated for example at 37, Fig. 2. After a moment's pause, the user actuates the operating mechanism to retract the blades 14 and 14a, thus instantly depositing by gravity, the entire plurality of items, as indicated at 40a, Fig. 3, on the hearth to begin the baking period. Immediately afterwards, the peel is removed from the hearth, ready for another loading operation.

In the mechanical-peel form of the invention it is desirable that its principal parts be made of wood, such as hard maple, in order that heat be not absorbed from the baking hearth, since otherwise an important object of the invention, namely, saving operators from enervating heat conditions, would be nullified.

The disposition of the blades 14 and 14a in pairs to move in mutually opposed directions from the supporting to the non-supporting positions, insures a substantially balanced descending action upon items that may be discharged from the blades, so that the items are guided quite accurately to their resting places on a surface and along a line substantially midway of the blades. This also insures a gentle and controlled impact of fragile items such as bakery goods of soft dough upon a hearth. A stop to prevent overtravel may be suitably located, for example, a pin at 35.

Frequently the device of the invention may be used to pick up simultaneously a plurality of items, especially in cases where the items have previously been deposited or placed by means of the same device. For picking up items, it is generally desirable that the free edges of the blades be brought quite close to a hearth 17a, substantially as shown in Figs. 4 and 5.

While a specific embodiment of the device of the invention is herein shown and described, this is to be considered illustrative only and not as limiting the invention other than by the scope imposed by the following claims.

1. A mechanical peel, including in combination, a frame having side rails adapted for placing on, and for removal from, a baking hearth; a second frame having side rails loosely disposed within the first frame so as to have lifting and retracting motions therein; item-supporting blades pivotally mounted in the first frame and extending unbrokenly from side rail to side rail of the first-mentioned frame so that the end portions of the blades are located directly underneath the side rails of the second-mentioned frame; motion-transmitting connections extending substantially vertically from the second frame to the end portions of the item-supporting blades at points spaced apart radially from the journal axis thereof; and mechanism operative to lift and retract the second frame.

2. A mechanical peel according to claim 1, wherein the motion-transmitting connections comprise links pivotally secured to the second frame and pivotally secured to the end portions of the item-supporting blades in proximity to the free edges thereof.

3. A mechanical peel including in combination, a frame adapted for placing on, and for removal from, a baking hearth; a second frame loosely disposed within the first frame so as to have lifting and retracting motions therein; item-supporting blades pivotally mounted in the first frame; motion-transmitting connections extending from the second frame to the item-supporting blades; and mechanism operative to lift and retract the second frame, the said mechanism comprising shafts spaced apart from each other and rotatable in journals forming parts of the second frame; arms extending from the said shafts; traction rollers rotatably disposed in the free end-portions of the said arms; bearing portions disposed on the first frame so as to coopcrate with the said traction rollers; and means for simultaneously imparting to the said shafts motion in directions opposed to each other.

4. A mechanical peel, comprising a stationary frame having side rails; another frame having side rails in spaced proximity to the first mentioned side rails and disposed for up-and-down motion within said stationary frame; a pair of oscillating peel blades extending unbrokenly from side rail to side rail of the stationary frame and so disposed that the end portions of the peel blades are directly under and in operative registry with the respective side rails of the second-mentioned frame; linkage means directly under a side rail of the movable frame, said linkage means extending operatively from the end portion of a blade to the movable frame; and operating means effective to cause the movable frame to rise or descend.

5. A mechanical peel, comprising a stationary frame having side rails; another frame having side rails in spaced proximity to the first-mentioned side rails and within the stationary frame; the second-mentioned side rails having depending spaced lobes disposed to accommodate a pivotal pin in double-shear relation; a pair of mutually oscillating blades extending unbrokenly from side rail to side rail of the stationary frame and so disposed that the end portions of the peel blades are located directly under the respective spaced lobes; linkage means extending from the end portions of the peel blades into the space between the said depending lobes; a pin extending in double-shear through the spaced lobes and the interposed linkage; and operating means effective to cause the movable frame to rise or descend.

6. A mechanical peel, comprising a stationary frame having side rails; another frame having side rails in spaced proximity to the first-mentioned side rails and disposed to rise or descend relatively to, and within, the stationary frame; a pair of spaced, mutually cooperating peel blades having paralleling near-to-each-other light finger edge-portions, and far-from-each-other heavy journal-edge portions, each peel blade being rotatable about its respective journal edge-portion in such a manner that the pair of peel blades mutually support or mutually discharge, as the case may me, certain bakery items, the said peel blades further, being of such length that the end portions thereof are located directly underneath the respective side rails of the movable frame; and linkage means connecting the finger edge-portions at the end portions of the respective peel blades, to the second-mentioned frame.

7. A mechanical peel, including in combination, a pair of blades made of substantially non-heat-absorbing material, each blade having a heavy journal edge-portion and a light finger edge-portion spaced apart therefrom, said edge-portions being connected to each other by a tapering, solid intermediate portion so the cross-section of the blade is given a solid, relatively slender, substantially V-shaped configuration; a frame in which said pair of blades is journaled with the finger edges thereof in relatively close, spaced, cooperative relation; and manipulating mechanism connected to each blade in proximity to the finger edge-portion thereof.

CARL E. FOERSTER.

REFERENCES CITED

The following references are of record in the file of this patent:

UNITED STATES PATENTS

| Number | Name | Date |
| --- | --- | --- |
| 987,780 | Weifenbach | Mar. 28, 1911 |
| 1,374,457 | Lang | Apr. 12, 1912 |
| 1,943,004 | Coppage | Jan. 9, 1934 |
| 2,232,578 | Wetsch | Feb. 18, 1941 |

FOREIGN PATENTS

| Number | Country | Date |
| --- | --- | --- |
| 22,721 | Great Britain | Oct. 5, 1912 |